(12) United States Patent
Roos et al.

(10) Patent No.: US 6,403,746 B1
(45) Date of Patent: Jun. 11, 2002

(54) METHOD FOR PREPARATION OF A COMPOSITION THAT CONTAINS POLYMER ESTER COMPOUNDS WITH LONG-CHAIN ALKYL RESIDUES AND USE OF THIS COMPOSITION

(75) Inventors: Sebastian Roos, Mainz (DE); Joseph Martin Bollinger, North Wales, PA (US); Markus Scherer, Lebach; Boris Eisenberg, Darmstadt, both of (DE)

(73) Assignee: RohMax Additives GmbH, Darmstadt (DE)

( * ) Notice: Subject to any disclaimer, the term of this patent is extended or adjusted under 35 U.S.C. 154(b) by 0 days.

(21) Appl. No.: 09/450,746

(22) Filed: Nov. 30, 1999

(51) Int. Cl.$^7$ ............................................. C08F 118/02
(52) U.S. Cl. ................... 526/319; 526/328; 526/328.5; 526/90; 526/95
(58) Field of Search ................. 526/319, 328, 526/328.5, 90, 95

(56) References Cited

U.S. PATENT DOCUMENTS 5,368,761 A    11/1994    Gore et al.

FOREIGN PATENT DOCUMENTS

| EP | 0 236 844 | 9/1987 |
| EP | 0 861 859 | 9/1998 |
| WO | WO 96/30421 | 10/1996 |
| WO | WO 97/18247 | 5/1997 |
| WO | WO 98/40415 | 9/1998 |
| WO | WO 98404415 | * 9/1998 |

* cited by examiner

Primary Examiner—David W. Wu
Assistant Examiner—William K Cheung
(74) Attorney, Agent, or Firm—Oblon, Spivak, McClelland, Maier & Neustadt, P.C.

(57) ABSTRACT

This invention concerns a method for preparation of poly (meth)acrylate composition, in which ethylenically unsaturated monomers are polymerized by means of initiators that have a transferable atomic group, and one or more catalysts that include at least one transition metal, in the presence of ligands that can form a coordination compound with the metallic catalyst(s) to form polymers, where ethylenically unsaturated monomers that contain 50–100 wt %, with respect to the total weight of the ethylenically unsaturated monomers, (meth)acrylates of formula (I)

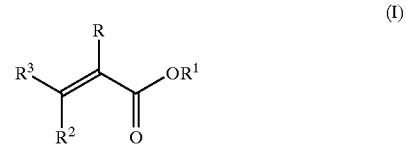

where R means hydrogen or methyl, $R^1$ means a linear or branched alkyl residue with 6–40 carbon atoms, $R^2$ and $R^3$ independently mean hydrogen or a group of the formula—COOR', where R' is hydrogen or a linear or branched alkyl residue with 6–40 carbon atoms, is polymerized in the presence of 5–95 wt % mineral oil, with respect to the total weight of the composition.

14 Claims, No Drawings

METHOD FOR PREPARATION OF A COMPOSITION THAT CONTAINS POLYMER ESTER COMPOUNDS WITH LONG-CHAIN ALKYL RESIDUES AND USE OF THIS COMPOSITION

The invention concerns a method for preparation of a composition that contains polymeric ester compounds with long-chain alkyl residues, where ethylenically unsaturated monomer mixtures, which contain at least 50 wt % ethylenically unsaturated ester compounds with alkyl or heteroalkyl chains with at least 6 carbon atoms, are polymerized with initiators that contain a transferable atomic group, and one or more catalysts that contain at least one transition metal, in the presence of ligands that can form a coordination compound with the metallic catalyst(s). The invention also concerns the use of these polymer compositions and a method for isolation of polymers from such a polymer solution.

Radical polymerization is an important commercial method for preparation of a large number of polymers such as PMMA and polystyrene. It is disadvantageous here that the constitution of the polymers, the molecular weight and the molecular weight distribution are ralatively diffcult to control.

One solution to these problem is offered by the so called ATRP process (=Atom Transfer Radical Polymerization). It is assumed that this is a "living" radical polymerization without any limitation being intended by the description of the mechanism. In this method a transition metal compound is reacted with a compound that has a transferable atomic group. In doing so the transferable atomic group is transferred to the transition metal compound, so that the metal becomes oxidized. In this reaction a radical forms and adds to ethylenic groups. The transfer of the atomic group to the transition metal compound, however, is reversible, so that the atomic group is transferred back to the growing polymer chain, whereby a controlled polymerization system is formed. Accordingly, the constitution of the polymer, the molecular weight and molecular weight distribution can be controlled.

This reaction method is described, for example, by J-S. Wang, et al., J. Am. Chem. Soc., Vol. 117, pp. 5614–5615 (1995), and by Matyjaszewski, Macromolecules, Vol. 28, pp. 7901–7910 (1995). Moreover, the patent applications WO 96/30421, WO 97/47661, WO 97/18247, WO 98/40415 and WO 99/10387 disclose variations of the ATRP explained above.

The mechanism described above is not undisputed. For example, WO 97/47661 indicates that the polymerization takes place not via a radical mechanism but rather via insertion. However, for the present invention this differentiation is unimportant, since compounds are used in the reaction method disclosed in WO 97/47661 that are also used in an ATRP.

The monomers, the transition metal catalysts, the ligands and the initiators are chosen each according to the desired polymer solution. It is assumed that a high reaction rate constant for the reaction between the transition metal-ligand complex and the transferable atomic group and a low concentration of free radicals in equilibrium are important for a narrow molecular weight distribution. If the concentration of free radicals is too high, typical termination reactions that are responsible for a broad molecular weight distribution occur. The exchange rate is dependent, for example, on the transferable atomic group, the transition metal, the ligands and the anion of the transition metal compound. The specialist will find valuable advice for choosing these components in, for example, WO 98/40415.

The advantages of the known ATRP polymerization method are limited, however, to monomers that are themselves polar or that exhibit good solubility in polar media. The isolated used of nonpolar aprotic hydrocarbons like benzene, toluene, xylene, cyclohexane and hexane is also known from the litature, but the polymers made with these solvents have clearly higher polydispersities. This effect is described, for example, in WO 98/40415. In Pol. Preprint (ACS, Div. Pol. Chem.), 1999, 40(2), 432, M. J. Ziegler et al. described, among other things, the poor cotrollability of the polymerization of t-butyl methacrylate if it takes place in bulk. If about 20–25 wt % polar solvents are used, both the molecular weight as well as the polydispersity can be improved. However, ethylenically unsaturated monomer mixtures that contain at least 50 wt % ethylenically unsaturated ester compounds with alkyl or hetroalkyl chains that have at least 6 carbon atoms, because of the limited solubility of ethylenically unsaturated ester compounds with alkyl or heteroalkyl residues with at least 6 carbon atoms, can be polymerized only poorly in polar solvents using the known ATRP methods. Moreover, these large amounts of polar solvents, in each case according to use, have to be separated from the composition after preparation of the polymers.

Taking into account the prior art, it is now the task of this invention to make available a methods for preparation of a poly(methy)acrylate composition where the polmers contained in the composition are to be formed of at least 50 wt % (meth)acrylates with alkyl or heteroalkyl chains with at least 6 carbon atoms. Moreover, the polymers contained in the composition have a narrow molecular weight distribution. In particular, the use of costly methods, for instance anionic polymerization, is to be avoided in the preparation of the polymer of the mixture.

Another task was to provide a method that can be carried out on an economical basis that is usable in large scale industry. Moreover, it should be possible to conduct the method easily and simply with commercially available components.

These as well as other not explicitly mentioned tasks, which however can easily be derived or developed from the introductory material, are solved by a method for preparation of a poly(meth)acrylate composition with all of the characteristics of claim 1. Expedient modifications of the method in accordance with the invention are protected in the subclaims that refer back to claim 1. With regard to the method for preparation of polymers claim 13 offers a solution to the underlying task, while claim 14 protects a preferred use of a polymer solutions By polymerizing ethylenically unsaturated monomers, which contain 50–100 wt %, with respect to the total weight of the ethylenically unsaturated monomers, of one or more ethylenically unsaturated ester compounds of formula (I)

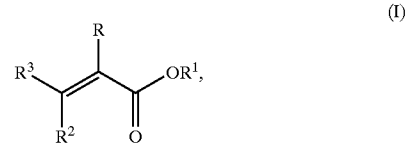

where R is hydrogen or methyl, $R^1$ means a linear or branched alkyl residue with 6–40 carbon atoms, $R^2$ and $R^3$ independently mean hydrogen or a group of the formula —COOR', where R' is hydrogen or a linear or branched alkyl residue with 6–40 carbons atoms, in the presence of 5–95 wt % mineral oil with respect to the total weight of the composition, one succeeds in making available, in a not easily foreseeable way, a method for preparation of a poly (meth)acrylate composition, with which a narrow polymer distribution can be achieved. Here ethylenically unsaturated monomers are polymerized by means of initiators that have a transferable atomic group, and one or more catalysts that contain at least one transition metal, in the presence of ligands that can form a coordination compound with the metallic catalyst(s). This preparation method can be carried out on a particularly cost favorable basis and to that extent is of industrial unterest.

It is particularly surprising that mineral oils can be used as solvents with particular success because many of the compositions used for the ATRP polymerization method contain polar solvents. The polymerization of mixtures of etheylenically unsaturated monomers, which contain up to at least 50 wt % ethylenically unsaturated ester compounds with longer-chain alkyl or heteroalkyl chains with at least 6 carbon atoms is hindered by the limited solubility of these compounds in polar solvents. If nonpolar solvents are used instead, one finds that polymer mixtures with considerably greater polydispersities are obtained than when conventional polar solvents are used. Moreover, the polymer yields in nonpolar solvents are in many cases lower. The product properties of such widely distributed polymer properties [sic] are insufficient for many industrial applications, for instance as additives to lubricant oils, so that other, many times more expensive methods have to be used.

At the same time a number of additional advantages can be achieved through the method in accordance with the invention. Among these are:

A narrow distribution of the polymers in the polymer composition prepared by the method.

The method in accordance with the invention enables excellent control of the molecular weight of the polymers contained in the compositions.

The conduct of the polymerization is relatively unproblematic with respect to pressure, temperature and solvents, and acceptable results are achieved under certain conditions even at moderate temperatures.

High yield can be achieved with aid of the method in accordance with the invention.

The method in accordance with the invention is low in side reactions.

The method can be carried out on a cost favorable basis.

Polymers with a predefined constitution and targeted structure can be produced with the aid of the method of this invention.

Characteristic for the method is the use of a mineral oil as solvent to polymerize ethylenically unsaturated monomer mixtures that contain at least 50 wt % ethylenically unsaturated ester compounds with alkyl or heteroalkyl chains with at least 6 carbon atoms.

Mineral oils are substantially known and commercially available. They are in general obtained from petroleum or crude oil by distillation and/or refining and optionally additional purification and processing methods, especially the higher-boiling fractions of crude oil or petroleum fall under the concept of mineral oil. In general, the boiling point of the mineral oil is higher than 200° C., preferably higher than 300° C., at 5000 Pa. Preparation by low temperature distillation of shale oil, coking of hard coal, distillation of lignite under exclusion of air as well as hydrogenation of hard coal or lignite is likewise possible. To a small extent mineral oils are also produced from raw materials of plant origin (for example jojoba, rapeseed oil) or animal origin (for example neatsfoot oil). Accordingly, mineral oils exhibit different amounts of aromatic, cyclic, branched and linear hydrocarbons, in each case according to origin.

In general, one distinguishes paraffin-base naphthenic and aromatic fractions in crude oil or mineral oil, where the term paraffin-base fraction stands for longer-chain or highly branched isoalkanes and naphthenic fraction stands for cycloalkanes. Moreover, mineral oils, in each case according to origin and processing, exhibit different fractions of n-alkanes, isoalkanes with a low degree of branching, so called monomethyl-branched paraffins, and compounds with heteroatoms, especially O, N and/or S, to which polar properties are attributed. However, attribution is difficult, since individual alkane molecules can have both long-chain branched and cycloalkane residues and aromatic components. For purposes of this invention, classification can be done in accordance with DIN 51 378. Polar components can also be determined in accordance with ASTM D 2007.

The fraction of n-alkanes in the preferred mineral oils is less than 3 wt %, and the fraction of O, N and/or S-containing compounds is less than 6 wt %. The fraction of aromatic compounds and monomethyl-branched paraffins is in general in each case in the range of 0–40 wt %. In accordance with one interesting aspect, mineral oil comprises mainly naphthenic and paraffin-base alkanes, which in general have more than 13, preferably more than 18 and especially preferably more than 20 carbon atoms. The fraction of these compounds is in general $\geq 60$ wt %, preferably $\geq 80$ wt %, without any limitation intended by this. A preferred mineral oil contains 0.5–30 wt % aromatic components, 15–40 wt % naphthenic components, 35–80 wt % paraffin-base components, up to 3 wt % n-alkanes and 0.05–5 wt % polar components, in each case with respect to the total weight of the mineral oil.

An analysis of especially preferred mineral oils, which was done with traditional methods such as urea dewaxing and liquid chromatography on silica gel, shows, for example, the following components, where the percentages refer to the total weight of the relevant mineral oil:

n-alkanes with about 18–31 C atoms: 0.7–1.0%, low-branched alkanes with 18–31 C atoms: 1.0–8.0%, aromatic compounds with 14–32 C atoms: 0.4–10.7%, iso- and cycloalkanes with 20–32 C atoms: 60.7–82.4%, polar compounds: 0.1–0.8%, loss: 6.9–19.4%.

Valuable advice regarding the analysis of mineral oil as well as a list of mineral oils that have other compositions can be found, for example, in Ullmann's Encyclopedia of Industrial Chemistry, 5$^{th}$ Edition on CD-ROM, 1997, under the entry "lubricants and related products."

This solvent is used in an amount of 5–95 wt %, preferably 5–80 wt %, especially preferably 5–60 wt % and really especially preferably 10–50 wt % with respect to the total weight of the mixture.

In addition, the composition can contain additional solvents, where the kind and amount is limited to the extent that they do not exert any disadvantageous effect, especially on the polydispersity or conversion. These solvents include, for example, synthetic oils. Synthetic oils are, among other things, organic esters, organic ethers such as silicone oils, and synthetic hydrocarbons, in particular polyolefins.

According to the method of this invention ethylenically unsaturated monomers are polymerized that contain 50–100 wt %, preferably 60–100 wt %, with respect to the total weight of the ethylenically unsaturated monomers, of one or more ethylenically unsaturated ester compounds of formula (I)

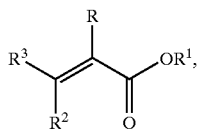

(I)

where R is hydrogen or methyl, $R^1$ means a linear or branched alkyl residue with 6–40 carbon atoms, preferably 6–24 carbon atoms, $R^2$ and $R^3$ independently means hydrogen or a group of the formula —COOR', where R' is hydrogen or a linear or branched alkyl residue with 6–40 carbon atoms. Here the alkyl residue can be linear, cyclic or branched.

The compounds in accordance with formula (I) include (meth)acrylates, maleates and fumarates, which in each case have at least one alcohol residue with 6–40 carbon atoms.

Preferred here are (meth)acrylates of formula (II)

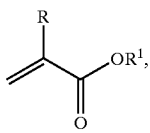

(II)

where R means hydrogen or methyl and $R^1$ means a linear or branched alkyl residue with 6–40 carbon atoms.

The term (meth)acrylates includes methacrylates and acrylates as well as mixtures of the two. These monomers are to a large extent known. These include, among others, (meth)acrylates that derive from saturated alcohols, such as hexyl (meth)acrylate, 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth) acrylate, 5-methylundecyl (meth)acrylate, dodecyl (meth) acrylate, 2-methyldodecyl (meth)acrylate, tridecyl (meth) acrylate, 5-methyltridecyl (meth)acrylate, tetradecyl (meth) acrylate, pentadecyl (meth)acrylate, hexadecyl (meth) acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate, and/or eicosyltetratriacontyl (meth)acrylate; (meth)acrylates that derive from unsaturated alcohols such as oleyl (meth)acrylate; cycloalkyl (meth)acrylates, such as 3-vinylcyclohexyl (meth)acrylate, cyclohexyl (meth)acrylate, bornyl (meth) acrylate.

The ester compounds with a long-chain alcohol residue can be obtained, for example, by reacting (meth)acrylates, fumarates, maleates and/or the corresponding acids with long-chain fatty alcohols, where in general a mixture of esters, for example (meth)acrylates with different long-chain alcohol residues, results. Among these fatty alcohols are Oxo Alcohol® 7911 and Oxo Alcohol® 7900, Oxo Alcohol® 1100 (Monsanto); Alphanol® 79 (ICI); Nafol® 1620, Alfol® 610 and Alfol® 810 (Condea); Epal® 610 and Epal® 810 (Ethyl Corporation); Linevol® 79, Linevol® 911 and Dobanol® 25L (Shell AG); Lial 125 (Augusta® Mailand); Dehydad® and Lorol® (Henkel KGaA) and Linopol® 7-11 and Acropol® 91 (Ugine Kuhlmann).

Besides the ethylenically unsaturated ester compounds that derive from alcohols with 6–40 carbons that are indicated as component (a), the monomer mixture can also contain other ethylenically unsaturated monomers that are copolymerizable with the said ester compounds. These monomers include, among others, b) 0–40 wt %, especially 0.5–20 wt %, of one or more (meth)acrylates of formula (III)

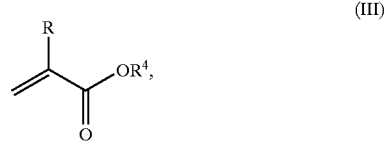

(III)

where R means hydrogen or methyl and $R^4$ means a linear or branched alkyl residue with 1–5 carbon atoms, c) 0–40 wt %, especially 0.5–20 wt %, of one or more (meth)acrylates of formula (IV)

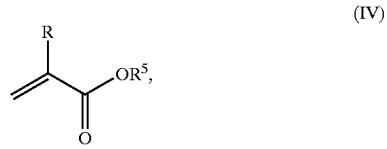

(IV)

where R means hydrogen or methyl and $R^5$ means an alkyl residue with 2–20, especially 2–6 carbon atoms that have been substituted with an OH group, or an alkoxylated residue of formula (V)

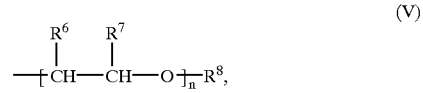

(V)

where $R^6$ and $R^7$ independently stand for hydrogen or methyl, $R^8$ stands for hydrogen or an alkyl residue with 1–40 carbon atoms and n stands for a whole number from 1–60, d) 0–40 wt %, especially 0.5–20 wt % of one or more (meth)acrylates of formula (VI)

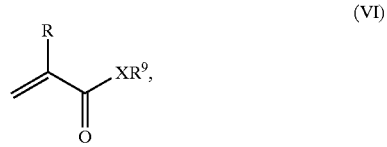

(VI)

where R means hydrogen or methyl, X means oxygen or an amino group of the formula —NH— or —$NR^{10}$—, where $R^{10}$ stands for an alkyl residue with 1–40 carbon atoms, and $R^9$ means a linear or branched alkyl residue with 2–20, preferably 2–6 carbon atoms, that has been substituted with at least one —$NR^{11}R^{12}$-group, where $R^{11}$ and $R^{12}$, independent of one another, stand for hydrogen, an alkyl residue with 1–20, preferably 1–6 [carbon atoms], or where $R^{11}$ and $R^{12}$ form, with the inclusion of the nitrogen atom and optionally another nitrogen or oxygen atom, a 5- or 6-member ring, which can optionally be substituted with $C_1$–$C_6$ alkyl, and e) 0–40 wt %, especially 0.5–20 wt %, of one or more comonomers, where the specification wt % in each case refers to the total weight of the ethylenically unsaturated monomers.

Examples of component (b) are, among others, (meth)acrylates that derive from saturated alcohols like methyl (meth)acrylate, ethyl (meth)acrylate, n-propyl (meth)acrylate, isopropyl (meth)acrylate, n-butyl (meth)acrylate, tert-butyl (meth)acrylate and pentyl (meth)acrylate; cycloalkyl (meth)acrylates like cyclopentyl (meth)acrylate; (meth)acrylates that derive from unsaturated alcohols like 2-propynyl (meth)acrylate and allyl (meth)acrylate, vinyl (meth)acrylate.

(Meth)acrylates in accordance with formula (IV) are known to the specialist. These include, among others, hydroxylalky (meth)acrylates like 3-hydroxypropyl methacrylate, 3,4-dihydroxybutyl methacrylate, 2-hydroxyethyl methacrylate, 2-hydroxypropyl methacrylate, 2,5-dimethyl-1,6-hexanediol (meth)acrylate, 1,10-decanediol (meth)acrylate, 1,2-propanediol (meth)acrylate; polyoxyethylene and polyoxypropylene derivatives of (meth)acrylic acid like triethyleneglycol (meth)acrylate, tetraethyleneglycol (meth)acrylate and tetrapropyleneglycol (meth)acrylate.

The (meth)acrylates or methacrylamides in accordance with formula (VI) (component (d)) include, among others, amides of (meth)acrylates like N-(3-dimethylaminopropyl) methacrylamide, N-(diethylphosphono)methacrylamide, 1-methacryloylamido-2-methyl-2-propanol, N-(3-dibutylaminopropyl)methacrylamide, N-t-butyl-N-(diethylphosphono)methacrylamide, N,N-bis(2-diethylaminoethyl)methacrylamide, 4-methacryloylamido-4-methyl-2-pentanol, N-(methoxymethyl)methacrylamide, N-(2-hydroxyethyl)methacrylamide, N-acetylmethacrylamide, N-(dimethylaminoethyl) methacrylamide, N-methyl-N-phenylmethacrylamide, N,N-diethylmethacrylamide, N-methylmethacrylamide, N,N-dimethylmethacrylamide, N-isopropylmethacrylamide; aminoalkyl methacrylates like tris(2-methacryloxyethyl) amine, N-methylformamidoethyl methacrylate, 2-ureidoethyl methacrylate; heterocyclic (meth)acrylates like 2-(1-imidazolyl)ethyl (meth)acrylate, 2-(4-morpholinyl)ethyl (meth)acrylate and 1-(2-methacryloyloxyethyl)-2-pyrrolidone.

Component (e) includes in particular ethylenically unsaturated monomers that can be polymerized with the ethylenically unsaturated ester compounds of formula (I), (II), (III), (IV) and/or (VI).

However, comonomers for polymerization in accordance with the invention that correspond to the following formula are especially suitable for polymerization in accordance with this invention:

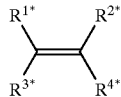

where $R^{1*}$ and $R^{2*}$ independently are selected from the group consisting of hydrogen, halogens, CN, linear or branched alkyl groups with 1–20, preferably 1–6 and especially preferably 1–4 carbon atoms, which can be substituted with 1 to (2n+1) halogen atoms, where n is the number of carbon atoms of the alkyl group (for example $CF_3$), $\alpha,\beta$-unsaturated linear or branched alkenyl or alkynyl groups with 2–10, preferably 2–6 and especially preferably 2–4 carbon atoms, which can be substituted with 1 to (2n-1) halogen atoms, preferably chlorine, where n is the number of carbon atoms of the alkyl group, for example $CH_2=CCl-$, cycloalkyl groups with 3–8 carbon atoms, which can be substituted with 1 to (2n-1) halogen atoms, preferably chlorine, where n is the number of carbon atoms of the cycloalkyl group; $C(=Y^*)R^{5*}$, $C(=Y^*)NR^{6*}R^{7*}$, $Y^*C(=Y^*)R^{5*}$, $SOR^{5*}$, $SO_1R^{5*}$, $OSO_2R^{5*}$, $NR^{8*}SO_2R^{5*}$, $PR^{5*}_2$, $P(=Y^*)R^{5*}_2$, $Y^*PR^{5*}_2$, $Y^*P(=Y^*)R^{5*}_2$, $NR^{8*}_2$, which can be quaternized with an additional $R^{8*}$, aryl, or heterocyclyl group, where $Y^*$ can be $NR^{8*}$, S or O, preferably O; $R^{5*}$ is an alkyl group with 1–20 carbon atoms, an alkylthio group with 1–20 carbon atoms, $OR^{15}$ ($R^{15*}$is hydrogen or an alkali metal), alkoxy with 1–20 carbon atoms, aryloxy or heterocyclyloxy; $R^{6*}$ and $R^{7*}$ independently are hydrogen or an alkyl group with 1–20 carbon atoms, or $R^{6*}$ and $R^{7*}$ together can form an alkylene group with 2–7, preferably 2–5 carbon atoms, where they form a 3- to 8-member, preferably 3- to 6-member ring, and $R^{8*}$ is linear or branched alkyl or aryl groups with 1–20 carbon atoms; $R^{3*}$ and $R^{4*}$ independently are chosen from the group consisting of hydrogen, halogen (preferably fluorine or chlorine), alkyl groups with 1–6 carbon atoms and $COOR^{9*}$, where $R^{9*}$ is hydrogen, an alkali metal or an alkyl group with 1–40 carbon atoms, or $R^{1*}$ and $R^{3*}$ can together form a group of the formula $(CH_2)_{n'}$, which can be substituted with 1–2n' halogen atoms or $C_1$–$C_4$ alkyl groups, or can form a group of the formula $C(=O)-Y^*-C(=O)$, where n' is from 2–6, preferably 3 or 4, and $Y^*$ is defined as before; and where at least 2 of the residues $R^{1*}$, $R^{2*}$, $R^{3*}$ and $R^{4*n}$ are hydrogen or halogen.

Component (e) includes in particular ethylenically unsaturated monomers that can be polymerized with the ester compounds of formula (I). These include, among others, nitriles of (meth)acrylic acid and other nitrogen-containing methacrylates like methacryloylamidoacetonitrile, 2-methacryloyloxyethylmethylcyanamide, cyanomethyl methacrylate; aryl (meth)acrylates like benzyl methacrylate or phenylmethacrylate, where the aryl residues in each case can be unsubstituted or substituted up to four times; carbonyl-containing methacrylates like 2-carboxyethyl (meth)acrylate, carboxymethyl (meth)acrylate, oxazolidinylethyl (meth)acrylate, N-(methacryloyloxy)formamide, acetonyl (meth)acrylate, N-methacryloylmorpholine, N-methacryloyl-2-pyrrolidinone; glycol dimethacrylates like 1,4-butanediol methacrylate, 2-butoxyethyl methacrylate, 2-ethoxyethoxymethyl methacrylate, 2-ethoxyethyl methacrylate, methacrylates of ether alcohols like tetrahydrofurfuryl methacrylate, vinyloxyethoxyethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate; methacrylates of halogenated alcohols like 2,3-dibromopropyl methacrylate, 4-bromophenyl methacrylate, 1,3-dichloro-2-propyl methacrylate, 2-bromoethyl methacrylate, 2-iodoethyl methacrylate, chloromethyl methacrylate; oxiranyl methacrylates like 2,3-epoxybutyl methacrylate, 3,4-epoxybutyl methacrylate, glycidyl methacrylate; phosphorus-, boron- and/or silicon-containing methacrylates like 2-(dimethylphosphato)propyl methacrylate, 2-(ethylenephosphito)propyl methacrylate, dimethylphosphinomethyl methacrylate, dimethylphosphonoethyl methacrylate, diethylmethacryloyl phosphonate, dipropylmethacryloyl phosphate; sulfur-containing methacrylates like ethylsulfinylethyl methacrylate, 4-thiocyanatobutyl methacrylate, ethylsulfonylethyl methacrylate, thiocyanatomethyl methacrylate, methylsulfinylmethyl methacrylate, bis(methacryloyloxyethyl) sulfide; trimethacrylates like trimethyloylpropane trimethacrylate; vinyl halides such as vinyl chloride, vinyl fluoride, vinylidene chloride and vinylidene fluoride; vinyl esters like vinyl acetate; styrenes, substituted styrenes with an alkyl substituent in the side chain, such as α-methylstyrene and α-ethylstyrene, substituted styrenes with an alkyl substituent on the ring such as vinyltoluene and p-methylstyrene, halogenated styrenes such as monochlorostyrenes, dichlorostyrenes, tribromostyrenes and tetrabromostyrenes; heterocyclic vinyl compounds like 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, 2-vinylfuran, vinylthiophene, vinylthiolane, vinylthiazoles and hydrogenated vinylthiazoles, vinyloxazoles and hydrogenated vinyloxazoles; vinyl and isophenyl ethers; maleic acid derivatives such as mono- and diesters of maleic acid, where the alcohol residues have 1–5 carbon atoms, maleic anhydride, methylmaleic anhydride, maleinimide, methylmaleinimide; fumaric acid and fumaric acid derivatives such as mono- and diesters of fumaric acid, where the alcohol residues have 1–5 carbon atoms; dienes such as divinyl benzene.

Besides styrene, monomers that have dispersing activity are especially preferred as comonomers, such as the previously mentioned heterocyclic vinyl compounds. These monomers are additionally designated as dispersing monomers.

Said ethylenically unsaturated monomers can be used individually or as mixtures. It is additionally possible to vary the monomer composition during the polymerization in order to obtain definite structures, such as block copolymers.

In preferred embodiments of the method in accordance with the invention at least 70 wt % of the ethylenically unsaturated monomers, especially preferably more than 80 wt % of the ethylenically unsaturated monomers, with respect to the total weight of the ethylenically unsaturated monomers, are (meth)acrylates, maleates and/or fumurates with alkyl or heteroalkyl chains that contain at least 6 carbon atoms.

Said monomers are polymerized by means of initiators that have a transferable atomic group. In general, these initiators can be described by the formula $Y-(X)_m$, where Y represents the core molecule, of which it is assumed that it forms radicals, X represents a transferable atom or a transferable atomic group and m is a whole number in the range of 1–10, depending on the functionality of group Y. If m>1, the various transferable atomic groups X can have differing importance. If the functionality of the initiator is >2, star polymers are obtained. Preferred transferable atoms or atomic groups are halogens such as Cl, Br and/or I.

As previously mentioned, it is assumed of group Y that it forms radicals which serve as the starting molecule, where this radical adds to the ethylenically unsaturated monomers. For this reason group Y preferably has substituents that can stabilize radicals. Among these substituents are —CN, —COR and $CO_2R$, where in each case R is an alkyl or aryl residue or aryl and/or heteroaryl group.

Alkyl residues are saturated or unsaturated, branched or linear hydrocarbon residues with 1–40 carbon atoms, such as methyl, ethyl, propyl, butyl, pentyl, 2-methylbutyl, pentenyl, cyclohexyl, heptyl, 2-methylheptenyl, 3-methylheptyl, octyl, nonyl, 3-ethylnonyl, decyl, undecyl, 4-propenylundecyl, dodecyl, tridecyl, tetradecyl, pentadecyl, hexadecyul, heptadecyl, octadecyl, nonadecyl, eicosyl, cetyleicosyl, docosyl and/or eicosyltetratriacontyl.

Aryl residues are cyclic aromatic residues that have 6–14 carbon atoms in the aromatic ring. These residues can be substituted. Substituents are, for example, linear and branched alkyl groups with 1–6 carbon atoms such as methyl, ethyl, propyl, butyl, pentyl, 2-methylbutyl or hexyl; cycloalkyl groups such as cyclopentyl and cyclohexyl; aromatic groups such as phenyl or naphthyl; amino groups, ether groups, ester groups and halides.

Among the aromatic residues are, for example, phenyl, xylyl, toluyl, naphthyl or biphenylyl.

The term "heteroaryl" identifies a heteroaromatic ring system, where at least one CH group is replaced by N or two neighboring CH groups by S, O or NH, such as a residue of thiophene, furan, pyrrole, thiazole, oxazole, pyridine, pyrimidine and benzo[a]furan, which likewise can have the previously mentioned substituents.

An initiator that can be used in accordance with the invention can be any compound that has one or more atoms or atomic groups that are radically transferable under the polymerization conditions.

Suitable initiators include those of the formulas:

$$R^{11}R^{12}R^{13}C-X$$

$$R^{11}C(=O)-X$$

$$R^{11}R^{12}R^{13}Si-X$$

$$R^{11}R^{12}N-X$$

$$R^{11}N-X_2$$

$$(R^{11})_nP(O)_m-X_{3-n}$$

$$(R^{11}O)_nP(O)_m-X_{3-n}$$

and $$(R^{11})(R^{12}O)P(O)_m-X,$$

where X is selected from the group consisting of Cl, Br, I, $OR^{10}$, [where $R^{10}$ is an alkyl group with 1–20 carbon atoms, where each hydrogen atom can independently be replaced by a halide, preferably chloride or fluoride, an alkenyl with 2–20 carbon atoms, preferably vinyl, an alkynyl with 2–10 carbon atoms, preferably acetylenyl or phenyl, which can be substituted with 1–5 halogen atoms or alkyl groups with 1–4 carbon atoms, or aralkyl (aryl-substituted alkyl in which the aryl group is phenyl or substituted phenyl and the alkyl group is an alkyl with 1–6 carbon atoms, such as benzyl, for example)], $SR^{14}$, $SeR^{14}$, $OC(=O)R^{14}$, $OP(=O)R^{14}$, $OP(=O)(OR^{14})_2$, $OP(=O)OR^{14}$, $O-N(R^{14})_2$, $S-C(=S)N(R^{14})_2$, CN, NC, SCN, CNS, OCN, CNO and $N_3$, where $R^{14}$ means an alkyl group or a linear or branched alkyl group with 1–20, preferably 1–10 carbon atoms, where two $R^{14}$ groups, is present, together can form a 5, 6 or 7-member heterocyclic ring; and $R^{11}$, $R^{12}$ and $R^{13}$ are independently chosen from the group consisting of hydrogen, halogens, alkyl groups with 1–20, preferably 1 to 10 and especially preferably 1–6 carbon atoms, cycloalkyl groups with 3–8 carbon atoms, $R^{8*}_3Si$, $C(=Y^*)R^{5*}$, $C(=Y^*)NR^{6*}R^{7*}$, where $Y^*$, $R^{5*}$, $R^{6*}$ and $R^{7*}$ are defined as above, COCl, OH, (preferably one of the residues $R^{11}$, $R^{12}$ and $R^{13}$ is OH), CN, alkenyl or alkynyl groups with 2–20 carbon atoms, preferably 2–6 carbon atoms and especially preferably allyl or vinyl, oxiranyl, glycidyl, alkylene or alkenylene groups with 2–6 carbon atoms, which are substituted with oxiranyl or glycidyl, aryl, heterocyclyl, aralkyl, aralkenyl (aryl-substituted alkenyl, where aryl is defined as above and alkenyl is vinyl, which is substituted with one or two $C_1$–$C_6$ alkyl groups and/or halogen atoms, preferably with chlorine), alkyl groups with 1–6 carbon atoms, in which one up to all of the hydrogen atoms, preferably one, is/are substituted by halogen, (preferably fluorine or chlorine, if one or more hydrogen atoms are replaced, and preferably fluorine, chlorine or bromine, if one hydrogen atom is replaced), alkyl groups with 1–6 carbon atoms, which with 1 to 3 substituents (preferably 1) are chosen from the group consisting of $C_1$–$C_4$ alkoxy, aryl, heterocyclyl, $C(=Y^*)R^{5*}$, (where $R^{5*}$ is defined as above), $C(=Y^*)NR^{6*}R^{7*}$ (where $R^{6*}$ and $R^{7*}$ are defined as above), oxiranyl and glycidyl (preferably not more than 2 of the residues $R^{11}$, $R^{12}$ and $R^{13}$ are hydrogen, especially preferably a maximum of one of the resides $R^{11}$, $R^{12}$ and $R^{13}$ is hydrogen); m is 0 or 1; and m=0, 1 or 2 [sic].

Among the especially preferred initiators are benzyl halides like p-chloromethylstyrene, α-dichloroxylene, α,α-diochloroxylene, α,α-dibromoxylene and hexakis (α-bromomethyl)benzene, benzyl chloride, benzyl bromide, 1-bromo-1-phenylethane and 1-chloro-1-phenylethane; carboxylic acid derivatives that are halogenated in α position such as propyl-2-bromopropionate, methyl 2-chloropropionate, ethyl 2-chloropropionate, methyl 2-bromopropionate, ethyl 2-bromoisobutyrate; tosyl halides such as p-toluenesulfonyl chloride; alkyl halides like tetrachloromethane, tribromomethane, 1-vinylethyl chloride, 1-vinylethyl bromide; and halogen derivatives of phosphoric acid esters like dimethylphosphoric chloride.

The initiator is in general used in a concentration in the range of $10^{-4}$–3 mol/L, preferably in the range of $10^{-3}$–$10^{-1}$ mol/L and especially preferably in the range of $5 \times 10^{-2}$–$5 \times 10^{-1}$ mol/L, without this intending to imply any limitation. The molecular weight of the polymer results from the ratio of initiator to monomer, if all of the monomer is converted. Preferably this ratio lies in the range of $10^{-4}$ to 1 up to 0.5 to 1, especially preferably in the range of $1 \times 10^{-3}$ to 1 up to $5 \times 10^{-2}$ to 1.

Catalysts that include at least one transition metal are used to conduct the polymerization. Here any transition metal compound that can produce a redox cycle with the initiator or the polymer chain that has a transferable atomic group can be used. In these cycles the transferable atomic group and the catalyst reversibly form a compound, with the degree of oxidation of the transition metal being increased or decreased. Here one assumes that radicals are released or trapped, so that the concentration of radicals stays very low. However, it is also possible that the insertion of ethylenically unsaturated monomers into the Y—X or $Y(M)_z$—X bond will be enabled or facilitated by the addition of the transition metal compound to the transferable atomic group, where Y and X have the meaning given above and M means the monomer, while z represents the degree of polymerization.

Preferred transition metals here are Cu, Fe, Co, Cr, Ne, Sm, Mn, Mo, Ag, Zn, Pd, Pt, Re, Rh, Ir, In, Yb, and/or Ru, which are used in appropriate degrees of oxidation. These metals can be used individually and as mixtures. It is assumed that these metals catalyze the redox cycles of the polymerization, with the redox pairs $Cu^+/Cu^{2+}$ or $Fe^{2+}/Fe^{3+}$, for example, being active. Accordingly, the metal compounds are added to the reaction mixture as halides such as chloride or bromide, as alkoxide, hydroxide, oxide, sulfate, phosphate or hexafluorophosphate or trifluoromethane sulfate. Among the preferred metallic compounds are $Cu_2O$, CuBr, CuCl, CuI, $CuN_3$, CuSCN, CuCN, $CuNO_2$, $CuNO_3$, $CuBF_4$, $Cu(CH_3COO)$ $Cu(CF_3COO)$, $FeBr_2$, $RuBr_2$, $CrCl_2$ and $NiBr_2$.

However, compounds in higher oxidation states can also be used, for example CuO, $CuBr_2$, $CuCl_2$, $CrCl_3$, $Fe_2O_3$ and $FeBr_3$. In these cases the reaction can be initiated with the aid of classical radical formers such as AIBN. Here the transition metal compounds are reduced at first, since they are reacted with the radicals generated from the classical radical formers. This is the reverse ATRP, as was described by Wang and Matyjaszewski in Macromolecules (1995) Vol. 28, pp. 7572–7573.

Moreover, the transition metals can be used for catalysis as metal in the zero oxidation state, especially in mixture with the previously mentioned compounds, as is indicated, for example, in WO 98/40415. In these cases the reaction rate of the conversion can be increased. It is assumed that in this way the concentration of catalytically active transition metal compound is increased, by comproportionating transition metals in a high oxidation state with metallic transition metal.

The molar ratio of transition metal to initiator lies in general in the range of 0.0001:1 to 10:1, preferably in the range of 0.001:1 to 5:1 and especially preferably in the range of 0.01:1 to 2:1, without this intending to imply any limitation.

The polymerization takes place in the presence of ligands that can form a coordination compound with the metallic catalyst(s). These ligands serve, among other things, to increase the solubility of the transition metal compound. Another important function of the ligands is that the formation of stable organometallic compounds is avoided. This is particularly important, since these stable compounds would not polymerize under the selected reaction conditions. In addition, it is assumed that the ligands facilitate the abstraction of the transferable atomic group.

These ligands are substantially known and are described, for example, in WO 97/18247 and WO 98/40415. These compounds in general have one or more nitrogen, oxygen, phosphorus and/or sulfur atoms, via which the metal atom can be bonded. Many of these ligands can in general be represented by the formula $R^{16}$—Z—$(R^{18}$—$Z)_m$—$R^{17}$, where $R^{16}$ and $R^{17}$ independently mean H, $C_1$–$C_{20}$ alkyl, aryl, heterocyclyl, which can optionally be substituted. These substituents include, among others, alkoxy residues and the alkylamino residues. $R^{16}$, and $R^{17}$ can optionally form a saturated, unsaturated or heterocyclic ring. Z means O, S, NH, $NR^{19}$, or $PR^{19}$, where $R^{19}$ has the same meaning as $R^{16}$. $R^{18}$ means, independently, a divalent group with 1–40 C atoms, preferably 2–4 C atoms, which can be linear, branched or cyclic, such as a methylene, ethylene, propane or butylene group. The meaning of alkyl and aryl was given above. Heterocyclyl residues are cyclic residues with 4–12 carbon atoms, in which one or more of the $CH_2$ groups of the ring has been replaced by heteroatom groups like O, S, NH and/or NR, where the residue R has the same meaning as $R^{16}$.

Another group of suitable ligands can be represented by the formula

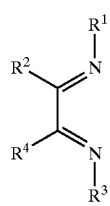

(VII)

where $R^1$, $R^2$, $R^3$ and $R^4$ independently mean H, $C_1$–$C_{20}$ alkyl, aryl, heterocyclyl and/or heteroaryl residues, where the residues $R^1$ and $R^2$ or $R^3$ and $R^4$ together can form a saturated or unsaturated ring.

Preferred ligands here are chelate ligands that contain N atoms.

Among the preferred ligands are triphenylphosphane, 2,2-bipyridine, alkyl-2,2-bipyridine like 4,4-di-(5-nonyl)-2,2-bipyridine, 4,4-di-(5-heptyl)-2,2 bipyridine, tris(2-aminoethyl)amine (TREN), N,N,N',N',N''-pentamethyldiethylenetriamine, 1,1,4,7,10,10-hexamethyltriethylenetetraamine and/or tetramethylethylenediamine. Other preferred ligands are described, for example, in WO 97/47661. The ligands can be used individually or as a mixture.

These ligands can form coordination compounds in situ with the metal compounds or they can be prepared initially as coordination compounds and then added to the reaction mixture.

The ratio of ligand to transition metal is dependent upon the dentation of the ligand and the coordination number of the transition metal. In general the molar ratio is in the range of 100:1 to 0.1:1, preferably 6:1 to 0.1:1 and especially preferably 3:1 to 0.5:1, without this intending to imply any limitation.

The monomers, the transition metal catalysts, the ligands and the initiators are chosen in each case according to the desired polymer solution. It is assumed that a high rate constant for the reaction between the transition metal-ligand complex and the transferable atomic group is important for a narrow molecular weight distribution. If the rate constant of this reaction is too low, the concentration of radicals will be too high, so that the typical termination reactions that are responsible for a broad molecular weight distribution will occur. The exchange rate is, for example, dependent on the transferable atomic group, the transition metal, the ligands and the anion of the transition metal compound. The specialist will find valuable advice for choosing these components in WO 98/40415, for example.

The polymerization can be carried out at normal pressure, reduced pressure or elevated pressure. The polymerization temperature is also not critical. However, in general it lies in the range of −20 to 200° C., preferably 0 to 130° C. and especially preferably 60 to 120° C., without any limitation intended by this.

Polymers with predetermined architecture can be obtained in a simple way with the aid of this method. These possibilities result from the "living" nature of the polymerization method. These structures include, among others, block copolymers, gradient copolymers, star copolymers, highly branched polymers, polymers with reactive end groups and graft copolymers. The polymers made in this way in general have a molecular weight in the range of 1,000 to 1,000,000 g/mol, preferably in the range of $10 \times 10^3$ to $500 \times 10^3$ g/mol and especially preferably in the range of $20 \times 10^3$ to $300 \times 10^3$ g/mol, without any limitation being intended by this. These values refer to the weight average molecular weight of the polydispersed polymers in the composition.

The particular advantage of ATRP compared to the traditional radical polymerization methods lies in the fact that polymers with narrow molecular weight distribution can be made. Without intending any limitation by this, polymers that have been produced by the method in accordance with the invention exhibit a polydispersity, given by $M_w/M_n$, in the range of 1–12, preferably 1–4.5, especially preferably 1–3, and really especially preferably 1.05–2.

According to an interesting aspect of the method in accordance with the invention the catalysts after polymerization can be separated by a solid-liquid separation process. This includes, for example, chromatography, centrifuging and filtration.

Preferably the catalyst is removed by filtration. For this the degree of oxidation at the transition metal is increased after the polymerization. By oxidizing the transition metal, the solubility of the catalyst decreases, in each case according to the choice of the ligand(s), so that the transition metal can be separated by filtration, if a solvent, in particular a mineral oil, whose dielectric constant is ≦4, preferably ≦3 and especially preferably ≦2.5 is present.

The oxidation of the transition metal can be carried out with well known oxidation agents such as oxygen, $H_2O_2$ or ozone. Preferably the catalyst is oxidized with atmospheric oxygen. Complete oxidation of the transition metal or transition metal compound is not necessary. In many cases contact between the composition and atmospheric air for a few minutes is sufficient to guarantee sufficient precipitation of the transition metal compound.

The filtration is substantially known and is described, for example, in Ullmann's Encyclopedia of Industrial Chemistry, Fifth Edition, under the entry "filtration." Preferably the composition is purified at a pressure difference in the range of 0.1–50 bar, preferably 1–10 bar and especially preferably 1.5–2.5 bar with a filter having a sieve size of 0.01 μm to 1 mm, preferably 1–100 μm and especially preferably 10–100 μm. These data are intended as a starting point, since the purification is dependent on both the viscosity of the solvent and the particle size of the precipitate.

The filtration takes place in a temperature range similar to the polymerization, where the upper range is dependent on the stability of the polymer. The lower limit follows from the viscosity of the solution.

The poly(meth)acrylate composition prepared in this way can easily be used as an additive in lubricant oils without additional purification. In addition, the polymer can be isolated from the composition.

For this the polymers can be separated from the composition by precipitation.

The invention is illustrated in more detail below by examples and comparison examples, without intending to limit the invention to these examples.

EXAMPLES 1–4

The ATRP polymerization experiments were carried out in mineral oil in accordance with the following general procedure.

The ATRP polymerization experiments were carried out in a four-neck round-bottom flask, which was equipped with a saber stirrer, a heating mantle, nitrogen inlet and rapid cooling system. The monomer mixture, which consisted of 258.2 g of an alkyl methacrylate mixture of $C_{12}$–$C_{18}$ alcohols and 29 g methyl methacrylate, and 72.5 g mineral oil (SM 920, Shell Co.; composition: 0.84% n-alkanes with about 18–31 C atoms, 5.16% low-branched alkanes with 18–31 C atoms, 8.8% aromatic compounds with 14–32 C atoms, 71.4% iso- and cycloalkanes with 20–32 C atoms, 0.6% polar compounds, 13.2% loss) were present in the reaction flask and inertized by the addition of dry ice and introduction of nitrogen. Then the corresponding amount of catalyst, in each case CuBr and ligand (pentamethyldiethylenetriamine (PMDETA) or bipyridine (bipy)) was added.

After heating to 90° C. the appropriate amount of initiator (ethyl 2-bromoisobutyrate (EBiB) or para-toluene sulfonyl chloride (pTSCl)) was added. The temperature in the reaction flask was raised to 100° C. or 105° C. After a reaction time of about 20 hours at the temperature given in the table the mixture was cooled to room temperature then the product was diluted with mineral oil and filtered to separate the transition metal catalyst. This mixture was analyzed by GPC.

The amounts of the components used in each case as well as the reaction temperature are given in Table 1. Table 2 summarizes the results that were obtained such as the conversion of the polymerization, the number average molecular $M_n$ and the polydispersity PDI of the resulting polymers.

Comparison Examples 1–4

The comparison experiments were carried out by analogy with the examples, using 72.5 g n-decane instead of mineral oil.

The amounts of the components used in each case as well as the reaction temperature are given in Table 1. Table 2 summarizes the results that were obtained such as the conversion of the polymerization, the number average molecular $M_n$ and the polydispersity PDI ($M_w/M_n$) of the resulting polymers.

TABLE 1

|  | Catalyst | Ligand [g] | Initiator [g] | temperature [° C.] |
|---|---|---|---|---|
| Example 1 | 0.54 | 0.65 PMDETA | 1.42 pTSCl | 100 |
| Comparison 1 | 0.54 | 0.65 PMDETA | 1.42 pTSCl | 100 |
| Example 2 | 0.64 | 2.1 bipy | 1.42 pTSCl | 105 |
| Comparison 2 | 0.64 | 2.1 bipy | 1.42 pTSCl | 105 |
| Example 3 | 0.54 | 0.65 PMDETA | 1.45 EBiB | 100 |
| Comparison 3 | 0.54 | 0.65 PMDETA | 1.45 EBiB | 100 |
| Example 4 | 1.34 | 2.92 bipy | 1.46 EBiB | 105 |
| Comparison 4 | 1.34 | 2.92 bipy | 1.46 EBiB | 105 |

Key:
1 Catalyst
2 Temperature
3 Example
4 Comparison

TABLE 2

|  | Conversion | Mn [g/mol] | PDI |
|---|---|---|---|
| Example 1 | 97.9 | 41.850 | 1.16 |
| Comparison 1 | 86.3 | 32.310 | 1.38 |
| Example 2 | 52.0 | 20.270 | 1.82 |
| Comparison 2 | 75.8 | 53.360 | 3.91 |
| Example 3 | 98.9 | 37.500 | 1.17 |
| Comparison 3 | 93.0 | 35.860 | 1.29 |
| Example 4 | 50.2 | 48.940 | 1.46 |
| Comparison 4 | 8.6 | 28.810 | 1.77 |

Key:
1 Conversion
2 Example
3 Comparison

What is claimed is:

1. A method for preparation of a poly(meth)acrylate compositions, in which ethylenically unsaturated monomers are polymerized by means of initiators that have a transferable atomic group, and one or more catalysts that contain at least one transition metal, in the presence of ligands that can form a coordination compound with the metallic catalyst(s), wherein ethylenically unsaturated monomers that contain 50–100 wt %, with respect to the total weight of the ethylenically unsaturated monomers, of one or more ethylenically unsaturated ester compound of formula (I)

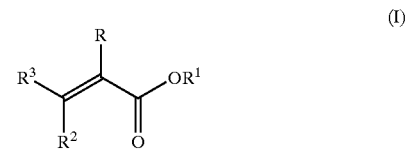

where R is hydrogen or methyl, $R^1$ means a linear or branched alkyl residue with 6–40 carbon atoms, $R^2$ and $R^3$ independently mean hydrogen or a group of the formula —COOR', where R' is hydrogen or a linear or branched alkyl residue with 6–40 carbon atoms, are polymerized in the presence of 5–95 wt % mineral oil, with respect to the total weight of the composition.

2. A method as in claim 1, wherein a mineral oil that contains 0.5–30 wt % aromatic components, 15–40 wt % napththenic components, 35–80% paraffinic components, up to 3 wt % n-alkanes and 0.05–5 wt % polar compounds, in each case with respect to the total weight of the mineral oil, is used.

3. A method as in claim 1 or 2, wherein said mineral oil is used in an amount in the range of 10–60 wt %, with respect to the total weight of the composition.

4. A method as in claim 1, wherein a monomer composition having at least 50 wt % of one or more (meth)acrylates of formula (II)

where R means hydrogen or methyl and $R^1$ means a linear or branched alkyl residue with 6–40 carbon atoms, is polymerized.

5. A method as in claim 1, wherein a monomer composition having a) 60–100 wt % of one or more ethylenically unsaturated ester compounds of formula (I)

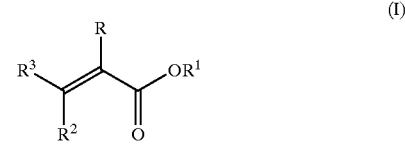

where R means hydrogen or methyl, $R^1$ means a linear or branched alkyl residue with 6–40 carbon atoms, $R^2$ and $R^3$ independently mean hydrogen or a group of the formula— COOR', where R' is hydrogen or a linear or branched alkyl residue with 6–40 carbon atoms, b) 0–40 wt % of one or more (meth)acrylates of the formula (III)

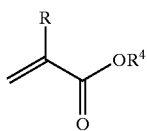

where $R^1$ means hydrogen or methyl and $R^4$ means a linear or branched alkyl residue with 1–5 carbon atoms, c) 0–40 wt % of one or more (meth)acrylates of formula (IV)

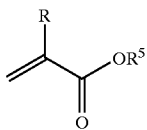

where R means hydrogen or methyl and $R^5$ means an alkyl residue with 2–20 carbon atoms substituted with an OH group or an alkoxylated residue of formula (V)

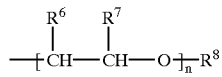

where $R^6$ and $R^7$ independently stand for hydrogen or methyl, $R^8$ stands for hydrogen or an alkyl residue with 1–40 carbon atoms and n stands for a whole number from 1–60, d) 0–40 wt % of one or more (meth)acrylates of formula (VI)

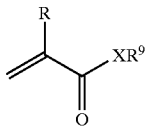

where R means hydrogen or methyl, X means oxygen or an amino group of the formula —NH— or —$NR^{10}$—, where $R^{10}$ stands for an alkyl residue with 1–40 carbon atoms and $R^9$ means a linear or branched alkyl residue with 2–20, that has been substituted with at least one —$NR^{11}R^{12}$— group, where $R^{11}$ and $R^{12}$, independent of one another, stand for hydrogen or an alkyl residue with 1–20 carbon atoms or where $R^{11}$ and $R^{12}$ together, while incorporating the nitrogen atom and optionally another nitrogen or oxygen atom, form a 5- or 6-member ring, which optionally can be substituted with $C_1$–$C_6$ alkyl, and e) 0–40 wt % of one or more comonomer, where the specification wt % in each case refers to the total weight of the ethylenically unsaturated monomers.

6. The method of claim 5, wherein $R^9$ means a linear or branched alkyl residue with 2–6 carbon atoms.

7. The method of claim 5, wherein $R^{11}$ and $R^{12}$, independent of one another, stand for hydrogen or an alkyl residue with 1–6 carbon atoms.

8. A method as in claim 5, wherein styrene, (meth)acrylate derivatives and/or dispersing monomers are used as comonomers.

9. A method as in claim 1, wherein said catalyst is selected from the group consisting of $Cu_2O$, CuBr, CuCl, CuI, $CuN_3$, CuSCN, CuCN, $CuNO_2$, $CuNO_3$, $CuBF_4$, $Cu(CH_3COO)$ or $Cu(CF_3COO)$.

10. A method as in claim 1, wherein at least one chelate ligand that contains N atoms is used.

11. A method as in claim 1, wherein an initiator that contains Cl, Br, I, SCN and/or $N_3$ is used.

12. A method as in claim 1, wherein said catalyst is separated by solid-liquid separation.

13. A method for preparation of polymers, wherein said polymer is isolated from a polymer solution that was obtained in accordance with the method of claim 1.

14. A method of modifying the properties of a lubricant comprising adding to a lubricant, a polymer prepared according to the method of claim 1.

* * * * *

UNITED STATES PATENT AND TRADEMARK OFFICE
CERTIFICATE OF CORRECTION

PATENT NO. : 6,403,746 B1
DATED : June 11, 2002
INVENTOR(S) : Roos et al.

It is certified that error appears in the above-identified patent and that said Letters Patent is hereby corrected as shown below:

Column 1,
Line 26, "problem", should read -- problems --.

Column 2,
Line 6, "uses", should read -- use --.
Line 8, "litature", should read -- literature --.
Line 28, "methods", should read -- method --.
Line 29, "(methy)", should read -- (meth) --.
Line 29, "polmers", should read -- polymers --.
Line 30, "50 %", should read -- 50 wt% --.,
Line 31, "% (meth)acrylates", should read -- (meth)acrylates --.
Line 51, "solutions" should read -- solution --.

Column 3,
Line 1, "5-95 wt", should read -- 5-95 wt% --.
Line 13, "unterest", should read -- interest --.
Line 18, "ethcylenically", should read -- ethylenically --.

Signed and Sealed this

Eighteenth Day of February, 2003

JAMES E. ROGAN
*Director of the United States Patent and Trademark Office*